(No Model.)
M. BAUER.
PHOTOGRAPHIC CAMERA.
No. 538,946. Patented May 7, 1895.
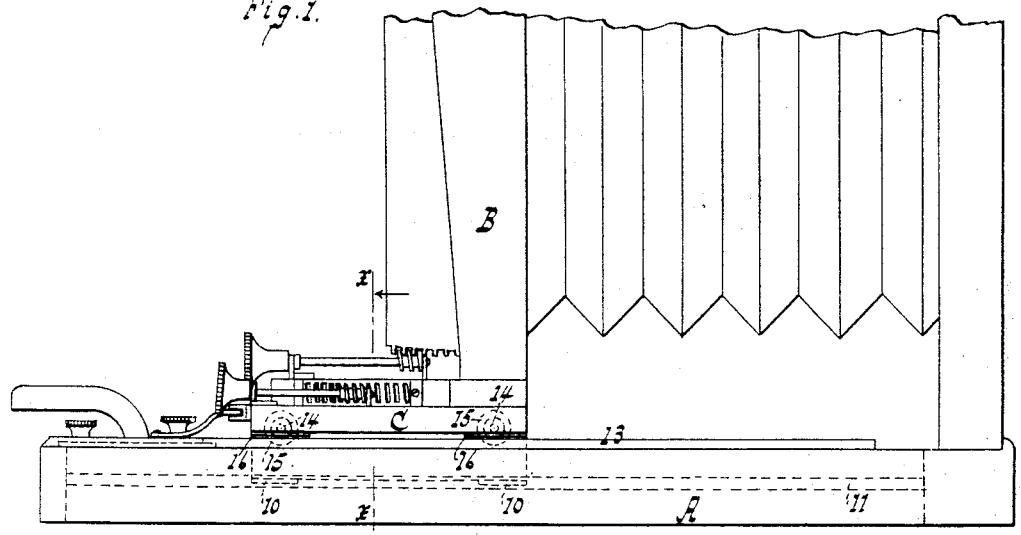
WITNESSES:
INVENTOR:
Max Bauer
BY
Hauff + Hauff
his ATTORNEYS.

UNITED STATES PATENT OFFICE.

MAX BAUER, OF GREENVILLE, NEW JERSEY.

PHOTOGRAPHIC CAMERA.

SPECIFICATION forming part of Letters Patent No. 538,946, dated May 7, 1895.

Application filed September 13, 1894. Serial No. 522,913. (No model.)

*To all whom it may concern:*

Be it known that I, MAX BAUER, a citizen of the German Empire, residing at Greenville, in the county of Hudson and State of New Jersey, have invented new and useful Improvements in Photographic Cameras, of which the following is a specification.

The object of this invention is to provide means by which a photographic camera can be adjusted in the proper focus with the greatest possible accuracy.

The peculiar and novel means for mounting a photographic camera on its base frame, which constitute my invention, are pointed out in the following specification and claims and illustrated in the accompanying drawings, in which—

Figure 1 is a side elevation of a photographic camera mounted according to my invention. Fig. 2 is an inverted plan view of the same. Fig. 3 is a transverse vertical section in the plane $x\ x$, Fig. 1, and looking in the direction of the arrow. Fig. 4 is a partial vertical longitudinal section in the plane $y\ y$, Fig. 3. Fig. 5 is a partial transverse vertical section in the plane $z\ z$, Fig. 4.

In the drawings the letter A designates the base frame, which supports the photographic camera B.

C is the bottom frame of the camera. To the under side of this bottom frame is firmly secured a block D (best seen in Fig. 3) provided with a lip 10 which engages a groove 11 in one of the longitudinal beams 12 of the base frame A so that said bottom frame cannot be thrown out of engagement with the base frame.

On the base frame A are secured rails 13 and to the under side of the bottom frame C are secured metallic rods 14 on which are loosely mounted the rollers 15 in such a position that they are adapted to engage the rails 13. Said rollers have a slight movement in the direction of their axis so that they can adapt themselves to the expansion and contraction of the wooden frames due to atmospheric influences and stops 16 limit the axial movement of said rollers. These stops may be formed by grooves 17 cut into the side rails of the bottom frame or by any other suitable means. In the example shown in the drawings said stops are formed by strips which also serve to retain the metallic rods 14 in grooves 19 formed in the bottom surface of the frame C.

Any suitable mechanism may be employed for moving the camera in the direction of the length of the rails 13 and by means of the loosely mounted rollers 15 I am enabled to move the camera with the greatest possible accuracy to the desired point, since all danger that the rollers will bind, is avoided and said rollers turn with perfect freedom without regard to atmospheric changes.

What I claim as new, and desire to secure by Letters Patent, is—

1. The combination with the base frame of a photographic camera, a camera having a bottom frame, and two rails secured to the base-frame, of two metallic rods secured to the bottom frame of the camera, four rollers engaging said rails and loosely mounted on the metallic rods and movable along the length thereof to compensate for expansion and contraction of the frames, and stops against which said rollers can abut for limiting their motion along the length of said rods, substantially as described.

2. The combination with the base frame of a photographic camera, a camera having a bottom frame, and two rails secured to the base-frame, of two metallic rods secured to the bottom frame of the camera, four flanged rollers engaging said rails and loosely mounted on said metallic rods and movable along the length thereof to compensate for expansion and contraction of the frames, and stops 16 arranged at opposite ends of each roller, whereby the motion of the rollers along the length of the rods is limited, substantially as described.

In testimony whereof I have hereunto set my hand in the presence of two subscribing witnesses.

MAX BAUER.

Witnesses:
WM. C. HAUFF,
E. F. KASTENHUBER.